Patented May 7, 1946

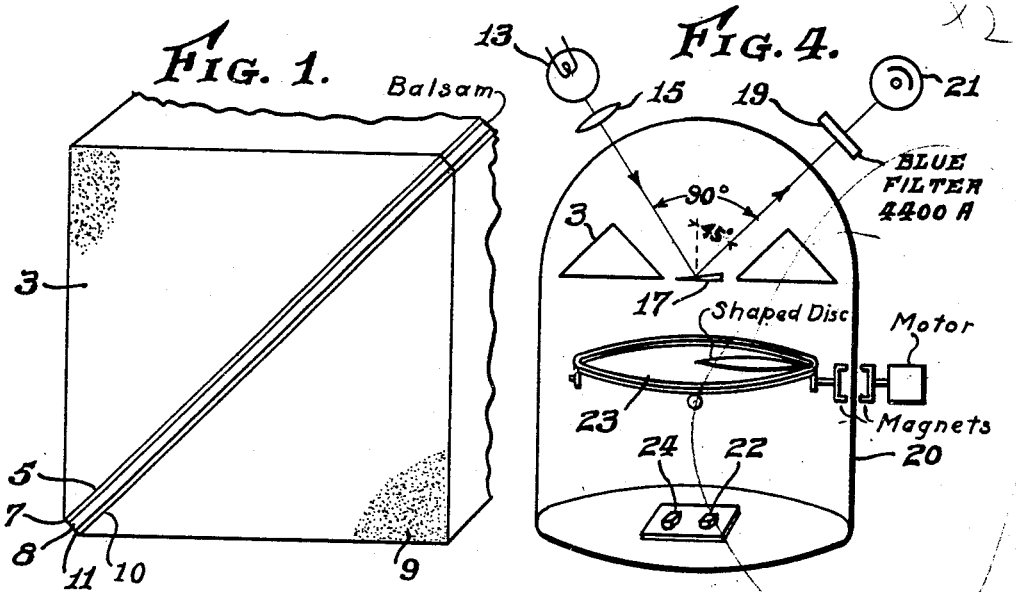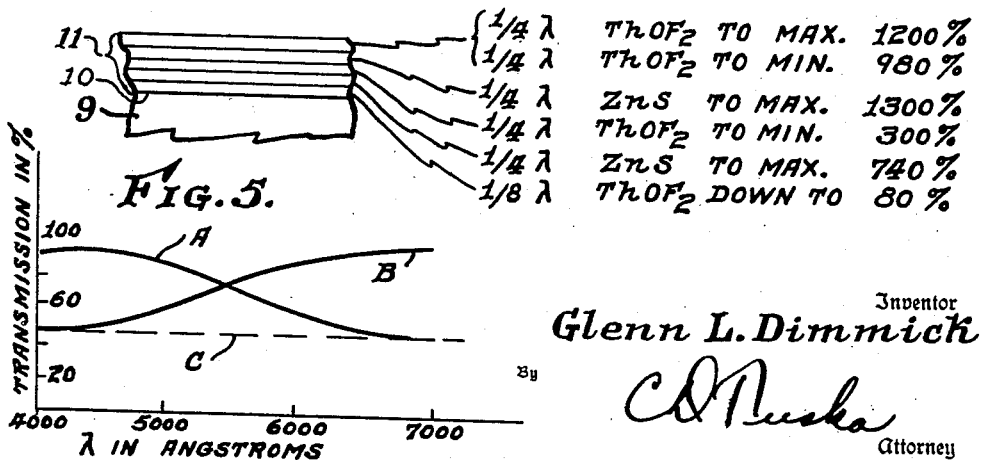

2,399,860

UNITED STATES PATENT OFFICE 2,399,860

OPTICAL NEUTRAL PRISM

Glenn L. Dimmick, Indianapolis, Ind., assignor to Radio Corporation of America, a corporation of Delaware Application June 8, 1943, Serial No. 490,021

9 Claims. (Cl. 88—1)

This invention relates to an improvement in optical neutral prisms and more particularly to an improvement in optical cubes having partial light transmission and partial reflection of light. This invention is particularly adapted for use in range finders and the like.

One object of my invention is to provide an optical cube having partial transmission and partial reflection of light and characterized by the fact that it is neutral in color and without absorption of light.

Another object of my invention is to provide an optical neutral cube that is characterized by substantially half transmission and half reflection of light.

Other incidental objects of my invention will be apparent to those skilled in the art from a reading of the following specification and an inspection of the accompanying drawing in which:

Fig. 1 is an enlarged end view of an optical cube made from a pair of prisms in accordance with my invention, Fig. 2 is a greatly enlarged end view of a portion of the upper prism shown in Fig. 1, with elements exaggerated in size for purposes of illustration, together with a table showing the arrangement and nature of said elements, Fig. 3 is a greatly enlarged end view of a portion of the lower prism of Fig. 1 with a similar table and showing of elements as in Fig. 2, Fig. 4 is a diagrammatic sketch illustrating the apparatus employed in controlling the thickness of the various layers during the evaporation process in a vacuum device, and Fig. 5 shows characteristic light transmission curves of the arrangements shown in Figs. 1 to 3.

In accordance with my invention I have provided a thin multi-layer film, made in accordance with the teachings of my copending application Serial No. 464,018 filed October 31, 1942, Selective reflector, upon each hypotenuse surface of adjacent optical prisms which together form a cube. These adjacent films are of such nature and so related to each other that the result is a partial light transmitting neutral cube without absorption. The thin film on each prism hypotenuse surface is characterized by selective reflection and no appreciable light absorption, and the films are substantially complementary in color. The combined effect of the films within the cube is to produce partial light transmission and partial light reflection, of the order of 50% for each, without appreciable color and without appreciable light absorption.

Referring to Fig. 1 an optical prism 3 has deposited upon its hypotenuse surface area 5 a multi-layer film 7 which is shown in detail in Fig. 2. Another prism 9, similar in shape and characteristics to prism 3, has deposited upon its hypotenuse surface a multi-layer film 11, the nature of which is disclosed in detail in Fig. 3. The film 7 on the first mentioned prism 3 is of such nature that this prism is yellow in color by reflection from daylight or white light and the film 11 on the second mentioned prism 9 is bluish in color by reflection. It is immaterial on which side the incident beam strikes the prism. Unlike a metallized surface, the neutral films of the present invention have the same optical properties, regardless of which side of the prism is used. Thus, whether the source of incident light and the observer are to the right or the left in Fig. 1, or whether they are above or below, the film 7 will reflect yellow light and the film 11 blue light, in the absence of any cause tending to change these colors. When, however, the two coated hypotenuse surfaces are made to confront each other, and are spaced apart as later described in more detail, the two films interact and appear to be of neutral color. The prisms could be coated to reflect any other two complementary colors such for instance as green and purple. The two coated hypotenuse surfaces of the prisms are then cemented together with Canadian balsam 8, or other suitable material, taking care that the adjacent surfaces are flat and that they are quite parallel when the cement dries or sets. If the surfaces are not parallel, double images will be seen through the prism. By way of example a pair of prisms coated in accordance with my invention were baked at about 160 degrees C. for about twelve hours and then cemented together. The films may be spaced apart a distance of from 10 to 100 wave lengths of light, or even more for some applications. A spacing of from ½ mil to 2 mils is desirable. It is essential that the films 7 and 11 on the adjacent prism surfaces be hard and durable, otherwise small particles of dust or dirt may rupture the films during the cementing process. The thorium oxy-fluoride surface coating, as described in the above mentioned copending application, results in a durable surface that satisfies this requirement.

Referring to Fig. 2 on the hypotenuse surface 5 of prism 3, a transparent support body of optical glass, there is deposited by evaporation in vacuo a thin film composed of alternate layers of thorium oxy-fluoride and zinc sulphide, starting and ending with layers of thorium oxy-fluoride, as disclosed in my above mentioned copending application. While I have referred to this compound of thorium and fluorine as thorium oxy-fluoride, it will be understood that it may be thorium fluoride for reasons given in my application, Ser. No. 470,583, filed December 30, 1942. The thorium oxy-fluoride has an index of refraction of approximately 1.52 after baking while zinc sulphide has a higher index of refraction of about 2.2. The thickness of each layer is indicated in the tables of Figs. 2 and 3 in relation to the maximum and minimum percent of reflection, using a 4400A blue filter and a control angle of 45°. The table of Fig. 2 shows the optical thickness and the percent reflection from the various layers of the yellow reflecting film. The layers are so related that the final result is a yellow color by reflection as indicated above. The same considerations apply to Fig. 3 wherein the layers are of such thickness and so interrelated that the final result is a coating film characterized by a bluish color by reflection. The table of Fig. 3 shows information, similar to that in Fig. 2, for a blue reflecting film. When the prisms are combined, as above described, the transmission of the combined film at any wave length is equal to the product of the two separate transmissions, being substantially neutral in color. In the apparatus used in the present invention, the optical wedge is made of spectacle crown glass on which to control the film thickness. This type of glass has approximately 4½ per cent reflection for blue light. As shown in Figure 2, uncoated glass is arbitrarily taken as having 100 per cent reflectivity. Since uncoated glass also has an absolute reflectivity of about 4½ per cent, this provides a reference point to determine the actual values of each of the other percentages in the list. The term "coating" refers to the coating material listed in Figures 2 and 3.

Referring to the table of Fig. 2, there is first evaporated onto the surface 5 a layer of thorium oxy-fluoride having an effective optical thickness of one-tenth of a wave length of blue light, at which thickness the reflection of light of that color from the coated surface is approximately 90 per cent of that from the uncoated surface. Zinc sulphide is then evaporated onto the surface on top of the thorium oxy-fluoride, and it will be found that the reflection rises to a maximum of 700 per cent of that from the original untreated surface, and that the thickness of the zinc sulphide layer at that maximum is one-quarter of the wave length of blue light. The evaporation of zinc sulphide is continued beyond the maximum, and when a further quarter-wave thickness of that material has been applied the reflection will have sunk to a minimum of 95 per cent of the reflection from the original untreated glass. Alternate layers of thorium oxy-fluoride and zinc sulphide are applied in accordance with the direction in the table of Fig. 2. The film 11 is similarly applied to the surface 10 in accordance with the directions in the table of Fig. 3.

Referring to Fig. 4, a light source is shown at 13 with a lens 15, a test wedge 17 of glass, filter 19 and a photocell 21. The test wedge is inside the bell jar 20 while the other units, above mentioned, are outside. Evaporating boats 22 and 24, preferably of molybdenum or platinum, are used for depositing the two above mentioned materials respectively. Each boat in turn may be brought to the center of the jar, preferably by magnetic means, not shown. A magnetically rotated compensator 23 causes the evaporated film to be uniform over a relatively large flat surface. The Fig. 5 curve A shows how the transmission varies with wave length for the film of Fig. 2. Curve B is for the film of Fig. 3. The dotted curve C is the overall transmission of the two films of Fig. 1 and is independent of color.

The result of my invention is an optical neutral cube having the unusual property of 50% light transmission and 50% light reflection without substantial absorption. As a result of this improvement over optical cubes heretofore known in the art, the invention has considerable utility in range finders and the like.

Having thus described my invention with considerable detail, and with respect to a broad form of my invention, the foregoing disclosure is to be regarded as descriptive and illustrative only, and not as restrictive or limitative of the invention, and I do not desire to be limited to such details since many changes and modifications may well be made without departing from the spirit and scope of my invention in its broadest aspect.

I claim as my invention:

1. An optical device comprising a pair of light-transparent elements having parallel, spaced, confronting, adjacent flat surfaces, a thin, transparent film disposed on one of said surfaces and composed of layers of zinc sulphide and of a compound including thorium and fluorine of such thicknesses as to appear yellow by reflection from white light, and a thin, transparent film disposed upon the adjacent surface of the other of said elements and composed of layers of zinc sulphide and of a compound including thorium and fluorine of such thicknesses as to appear bluish by reflection from white light, resulting in a combination characterized by substantial neutrality in color and substantially half-light transmission without absorption.

2. An optical device comprising a pair of light-transparent bodies, each having a flat surface, thin, evaporated, multi-layer transparent films upon each of said surfaces, each of said films comprising alternate layers of zinc sulphide and of a compound which includes thorium and fluorine, said layers having such respective thicknesses as to make said films respectively selective of light of complementary colors, and means for securing said bodies together with said films in closely spaced, parallel, confronting relationship.

3. The invention as set forth in claim 2 wherein the layers of said films which are immediately adjacent said respective surfaces are of a compound which includes thorium and fluorine.

4. The invention set forth in claim 2 wherein the last-applied layer of each of said films is of a compound which includes thorium and fluorine.

5. The invention as set forth in claim 2 wherein said films are spaced apart a distance of from ten to 100 wave lengths of light.

6. An optical cube comprising a pair of transparent prisms with confronting hypotenuse surfaces, a coating on one of said surfaces consisting of the following substances applied in the order named and to the thicknesses specified:

| Substance | Thickness in wavelengths of blue light— (4400A.) |
|---|---|
| Thorium oxy-fluoride | 1/10 |
| Zinc sulphide | 1/2 |
| Thorium oxy-fluoride | 1/4 |
| Zinc sulphide | 1/2 |
| Thorium oxy-fluoride | 1/2 | a coating on the other of said surfaces consisting of the following substances applied in the order named and to the thicknesses specified:

| Substance | Thickness in wavelengths of bluelight— (4400A.) |
|---|---|
| Thorium oxy-fluoride | 1/2 |
| Zinc sulphide | 1/4 |
| Thorium oxy-fluoride | 1/4 |
| Zinc sulphide | 1/4 |
| Thorium oxy-fluoride | 1/8 | and transparent optical cement interposed between said coatings and maintaining them in spaced, parallel relationship at a distance from each other of from ten to 100 wave lengths of light.

7. An optical cube comprising a pair of transparent prisms with confronting hypotenuse surfaces, a thin multi-layer transparent film disposed upon the hypotenuse surface of one of said prisms, the successive layers of said film being of different substances having different indexes of refraction and characterized by having no appreciable absorption, the thicknesses of each layer being chosen such that the composite film is selectively reflective of light of a predetermined color, the hypotenuse surface of the other of said prisms having a deposited, thin, multi-layer film, having characteristics similar to said first-mentioned film but characterized in that the thicknesses of each layer are chosen such that the composite film is selectively reflective of light of a color complementary to said predetermined color, and transparent optical cement spacing said films apart a distance of from 10 to 100 wave lengths of light, resulting in a combination characterized by partial light transmission and partial light reflection without appreciable color and without appreciable light absorption.

8. An optical cube comprising a pair of transparent prisms having hypotenuse surfaces and having disposed upon one of said surfaces a thin, multi-layer, transparent film the successive layers of which comprise different substances having different indexes of refraction, the thicknesses of each layer being chosen such that the composite film is yellow by reflection from white light and having disposed upon the hypotenuse surface of the other of said prisms a multi-layer film similar to said first mentioned film but having the thicknesses of each layer chosen such that the composite film is bluish by reflection from white light, and means for securing said surfaces with said films in superposed, confronting, parallel relationship, forming an optical cube characterized by substantial neutrality in color and by substantially 50 per cent. light transmission and 50 per cent. light reflection.

9. An optical cube consisting of a pair of transparent prisms with confrontingly parallel hypotenuse surfaces spaced from each other by transparent optical cement at a distance of from 10 to 100 wave lengths of light to be transmitted by said cube in addition to the thickness of the coatings hereinafter mentioned, a transparent multi-layer substantially non-absorbent coating on one of said surfaces, successive layers of which comprise different substances having different indexes of refraction and being of such thicknesses that the composite film is selectively reflective of light of one color, and a transparent multi-layer substantially non-absorbent coating on the other of said surfaces said second coating being similar to said first mentioned coating but being selectively reflective of light of a color complementary to said first color, each of said coatings having substantially negligible absorption of light.

GLENN L. DIMMICK.